United States Patent
Zhang et al.

(10) Patent No.: US 12,379,652 B2
(45) Date of Patent: Aug. 5, 2025

(54) MULTICOLOR LIGHT MIXING MODULE

(71) Applicant: QISDA CORPORATION, Taoyuan (TW)

(72) Inventors: Jia-Ming Zhang, Taichung (TW); Ching-Tze Huang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 199 days.

(21) Appl. No.: 18/221,887

(22) Filed: Jul. 14, 2023

(65) Prior Publication Data

US 2024/0069421 A1 Feb. 29, 2024

(30) Foreign Application Priority Data

Aug. 23, 2022 (CN) .......................... 202211011602.8

(51) Int. Cl.
*G03B 21/20* (2006.01)

(52) U.S. Cl.
CPC ..... *G03B 21/2033* (2013.01); *G03B 21/2013* (2013.01); *G03B 21/208* (2013.01)

(58) Field of Classification Search
CPC ............ G02B 19/0066; G02B 19/0009; G02B 19/0014; G02B 26/0816; G02B 27/1006; G02B 6/4296; G03B 21/20
See application file for complete search history.

(56) References Cited

U.S. PATENT DOCUMENTS

| | | | |
|---|---|---|---|
| 7,212,554 B2* | 5/2007 | Zucker | H01S 5/141 372/99 |
| 2008/0198593 A1* | 8/2008 | Breinich | G02B 27/1006 362/231 |
| 2013/0058092 A1* | 3/2013 | Anisimov | G02B 27/20 362/259 |
| 2015/0076368 A1* | 3/2015 | Sargent | H01L 25/0753 362/249.02 |

* cited by examiner

*Primary Examiner* — William J Carter (57) ABSTRACT

A multicolor light mixing module includes a first laser set, a light-mixing unit, a light-homogenizing member and a condensing lens. The first laser set includes a plurality of first lighting units and at least one second lighting unit arranged symmetrically relative to a first symmetrical axis. The light-mixing unit is obliquely disposed on a first light-mixing axis and is opposite to the first lighting unit and the second lighting unit for reflecting a first color light of the first lighting unit and a second color light of the second lighting unit to cooperatively form a first laser beam along the first light-mixing axis. The light-homogenizing member is disposed on the first light-mixing axis for homogenizing the first laser beam. The condensing lens is disposed on the first light-mixing axis and located between the light-homogenizing member and the light-mixing unit for condensing the first laser beam.

16 Claims, 6 Drawing Sheets

MULTICOLOR LIGHT MIXING MODULE

BACKGROUND OF THE INVENTION

1. Field of the Invention

The present invention relates to a multicolor light mixing module, and more specifically, to a multicolor light mixing module disposing a first lighting unit and a second lighting unit in a symmetrical arrangement and utilizing a light-mixing unit to mixing a first color light and a second color light.

2. Description of the Prior Art

In general, a conventional laser projection apparatus adopts a light mixing module to provide a multicolor laser beam for subsequent image projection. In the practical application, for further reducing the overall volume of a laser source of the laser projection apparatus, the common design involves packaging red, green, and blue laser diodes in a side-by-side arrangement into one multicolor laser source module, so as to simultaneously provide red, green and blue color lights to the light mixing module of the laser projection apparatus.

However, since the aforesaid packaging design only arranges the red, green, and blue laser diodes in multiple rows sequentially (e.g., arranging a plurality of red laser diodes in a row and arranging a plurality of green and blue laser diodes in another row), it may cause an uneven color distribution problem on an image projected by the laser projection apparatus (e.g., the image having a greenish upper portion and a bluish lower portion), so as to reduce the image projection quality of the laser projection apparatus.

SUMMARY OF THE INVENTION

The present invention provides a multicolor light mixing module suitable for providing a multicolor laser beam to a laser projection apparatus. The multicolor light mixing module includes a first laser set, a light-mixing unit, a light-homogenizing member and a condensing lens. The first laser set includes a plurality of first lighting units and at least one second lighting unit. At least one of the plurality of first lighting units and the at least one second lighting unit is arranged symmetrically relative to a first symmetrical axis. The plurality of first lighting units emits a first color light. The at least one second lighting unit emits a second color light. The light-mixing unit is obliquely disposed on a first light-mixing axis and opposite to the plurality of first lighting units and the at least one second lighting unit, for reflecting the first color light and the second color light to cooperatively form a first laser beam along the first light-mixing axis. The light-homogenizing member is disposed on the first light-mixing axis for homogenizing the first laser beam. The condensing lens is disposed on the first light-mixing axis and located between the light-homogenizing member and the light-mixing unit for condensing the first laser beam.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
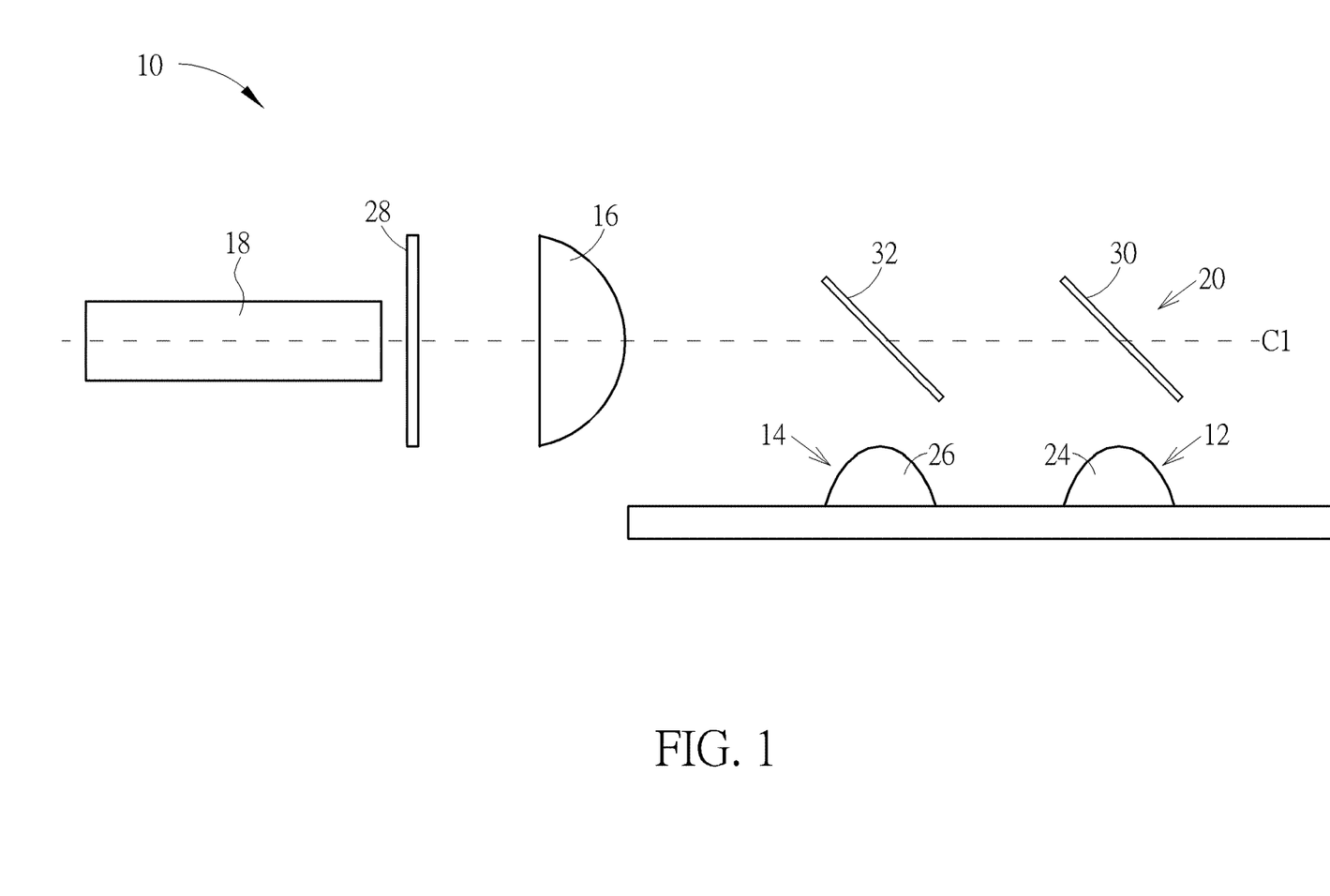
FIG. 1 is a side view of a multicolor light mixing module according to an embodiment of the present invention.
Figure 2:
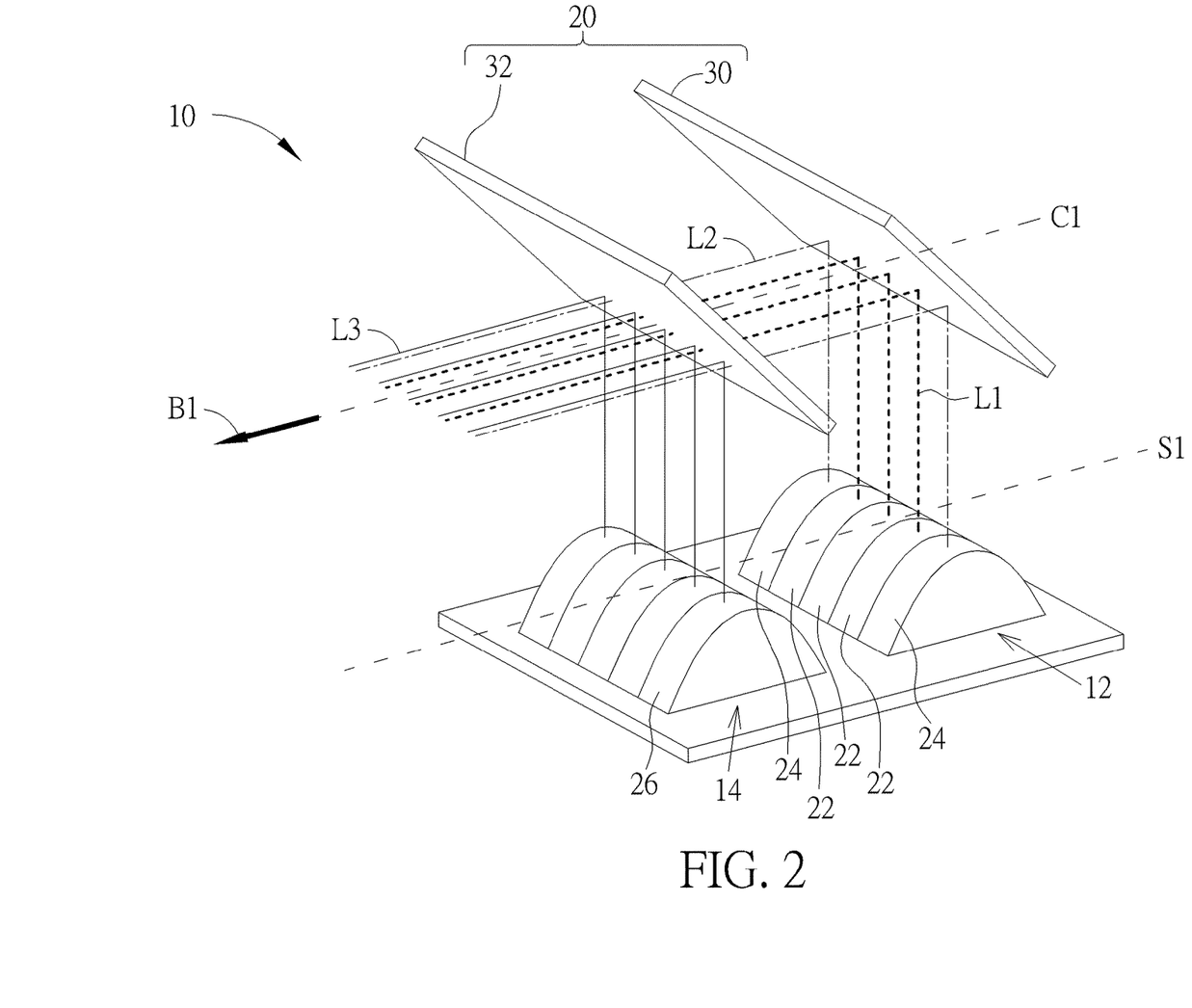
FIG. 2 is a diagram of the multicolor light mixing module in FIG. 1.

Please refer to FIG. 1 and FIG. 2. FIG. 1 is a side view of a multicolor light mixing module 10 according to an embodiment of the present invention. FIG. 2 is a diagram of the multicolor light mixing module 10 in FIG. 1. As shown in FIG. 1 and FIG. 2, the multicolor light mixing module 10 is suitable for providing a multicolor laser beam to a laser projection apparatus for subsequent image projection. The multicolor light mixing module 10 includes a first laser set 12, a second laser set 14, a condensing lens 16, a light-homogenizing member 18, and a light-mixing unit 20. For more clearly showing the light path of the multicolor light mixing module 10, only the first laser set 12, the second laser set 14, and the light-mixing unit 20 are depicted in FIG. 2 and the other optical components (e.g., the condensing lens 16 and the light-homogenizing member 18) of the multicolor light mixing module 10 are omitted herein.

The first laser set 12 includes a plurality of first lighting units 22 (three shown in FIG. 2, but not limited thereto) and at least one second lighting unit 24 (two shown in FIG. 2, but not limited thereto). The second laser set 14 includes a plurality of third lighting units 26 (five shown in FIG. 2, but not limited thereto). The first lighting unit 22 could be preferably a green laser diode for emitting a first color light L1 (i.e., green light). The second lighting unit 24 could be preferably a blue laser diode for emitting a second color light L2 (i.e., blue light). The third lighting unit 26 could be preferably a red laser diode for emitting a third color light L3 (i.e., red light). The present invention is not limited to the aforesaid design, meaning that the color configuration and the type of light source could be varied with the practical application of the multicolor light mixing module 10. Furthermore, in this embodiment, the first lighting units 22 and the second lighting units 24 could be arranged symmetrically relative to a first symmetrical axis S1 (in blue-green-green-green-blue order as shown in FIG. 2, but not limited thereto), and the third lighting units 26 could be arranged symmetrically relative to the first symmetrical axis S1 (in red-red-red-red-red order as shown in FIG. 2, but not limited thereto). The first symmetrical axis S1 could be preferably parallel to a first light-mixing axis C1 (but not limited thereto).

The condensing lens 16 is disposed on the first light-mixing axis C1 and located between the light homogenizing member 18 and the light-mixing unit 20, for condensing a first laser beam B1 mixed by the light-mixing unit 20. The light-homogenizing member 18 could be preferably a hollow light-homogenizing pipe (but not limited thereto, meaning that the present invention could adopt other light-homogenizing member commonly applied to a light-mixing module, such as a solid light-homogenizing column). The light-homogenizing member 18 is disposed on the first light-mixing axis C1 to homogenize the first laser beam B1 transmitted from the condensing lens 16 for providing a multicolor laser beam to a laser projection apparatus for subsequent image projection. Moreover, in the practical application, the multicolor light mixing module 10 could further include a diffusing sheet 28. The diffusing sheet 28 is disposed between the light-homogenizing member 18 and the condensing lens 16 for receiving the condensed first laser beam B1 and diffusing the first laser beam B1 to the light-homogenizing member 18 evenly. As for the related description for the condensing design of the condensing lens 16, the homogenizing design of the light-homogenizing member 18 and the diffusing design of the diffusing sheet 28, it could be commonly seen in the prior art and omitted herein.

More detailed description for the light-mixing unit 20 is provided as follows. As shown in FIGS. 1-2, the light-mixing unit 20 is obliquely disposed on the first light-mixing axis C1 and opposite to the first lighting unit 22, the second lighting unit 24 and the third lighting unit 26, for reflecting the first color light L1, the second color light L2 and the third color light L3 to cooperatively form the first laser beam B1 along the first light-mixing axis C1. To be more specific, in this embodiment, the light-mixing unit 20 includes a reflecting sheet 30 and a dichroic sheet 32. The reflecting sheet 30 is obliquely disposed on the first light-mixing axis C1 and opposite to the first lighting unit 22 and the second lighting unit 24 (preferably, an oblique angle of the reflecting sheet 30 relative to the first light-mixing axis C1 is equal to 45°, but not limited thereto) for reflecting the first color light L1 and the second color light L2. The dichroic sheet 32 is obliquely disposed on the first light-mixing axis C1 and opposite to the third lighting unit 26 (preferably, an oblique angle of the dichroic sheet 32 relative to the first light-mixing axis C1 is equal to 45°, but not limited thereto). The dichroic sheet 32 is located between the condensing lens 16 and the reflecting sheet 30 for reflecting the third color light L3 to travel along the first light-mixing axis C1 and allowing the first color light L1 and the second color light L2 to pass therethrough, so as to make the third color light L3 form the first laser beam B1 cooperatively with the first color light L1 and the second color light L2. In such a manner, the light-mixing unit 20 can achieve the light mixing effect to provide a multicolor laser beam to a laser projection apparatus for subsequent image projection.

In summary, compared with the prior art adopting the packaging design which arranges the red, green, and blue laser diodes in multiple rows sequentially (e.g., arranging a plurality of red laser diodes in a row and arranging a plurality of green and blue laser diodes in another row), the multicolor light mixing module of the present invention adopts the design in which the first lighting units 22, the second lighting units 24 and the third lighting units 26 are arranged symmetrically and the light-mixing unit 20 is utilized to mix the first color light L1, the second color light L2, and the third color light L3, so as to achieve the light mixing effect that the present invention can provide the laser beam with multicolor lights distributed in proper proportions. In such a manner, the present invention can efficiently solve the uneven color distribution problem on the image projected by the laser projection apparatus (e.g., the image having a greenish upper portion and a bluish lower portion) aforementioned in the prior art, so as to greatly improve the image projection quality and color uniformity of the laser projection apparatus.

Figure 3:
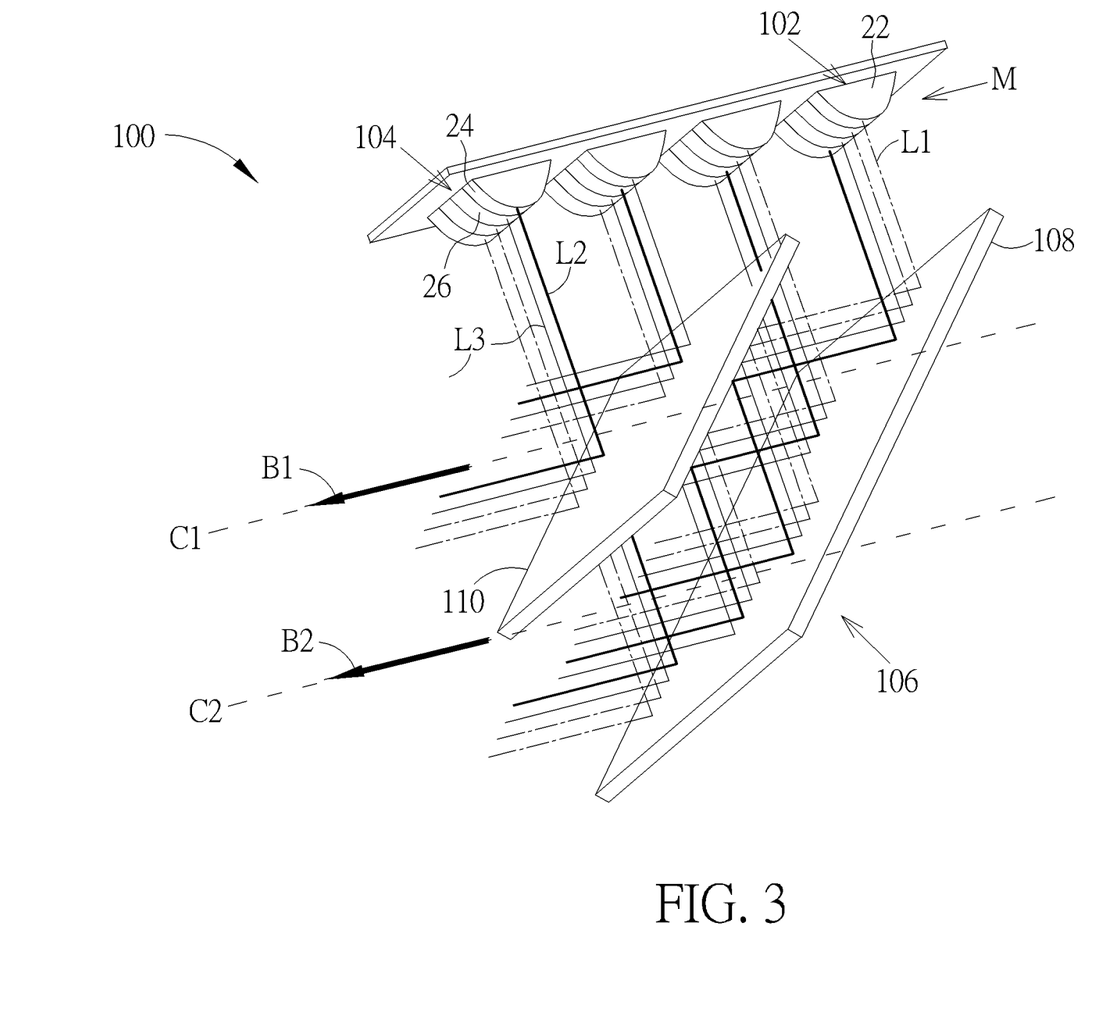
FIG. 3 is a diagram of a multicolor light mixing module according to another embodiment of the present invention.
Figure 4:
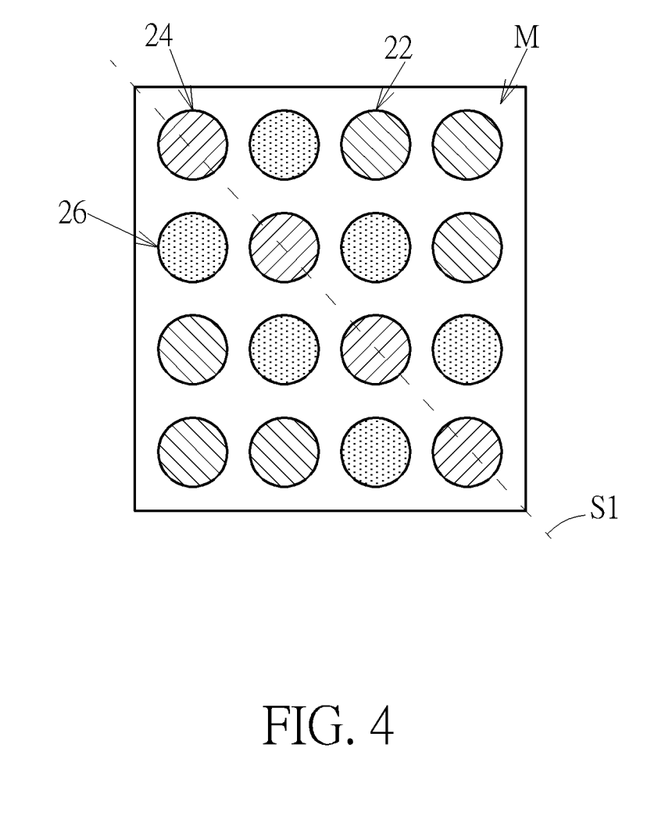
FIG. 4 is an arrangement diagram of first lighting units, second lighting units and third lighting units in FIG. 3.

It should be mentioned that the symmetrical configuration of the multicolor light mixing module of the present invention is not limited to the aforesaid embodiment. For example, please refer to FIG. 3 and FIG. 4. FIG. 3 is a diagram of a multicolor light mixing module 100 according to another embodiment of the present invention. FIG. 4 is an arrangement diagram of the first lighting units 22, the second lighting units 24 and the third lighting units 26 in FIG. 3. Components both mentioned in this embodiment and the aforesaid embodiment represent components with similar structures or functions, and the related description could be reasoned by analogy according to the aforesaid embodiment and omitted herein. As shown in FIG. 3, in this embodiment, the multicolor light mixing module 100 could include a first laser set 102, a second laser set 104, the condensing lens 16, the light-homogenizing member 18, the diffusing sheet 28 and a light-mixing unit 106, and the light-mixing unit 106 includes a reflecting sheet 108 and a transmissive and reflective sheet 110. For more clearly showing the light path of the multicolor light mixing module 100, only the first laser set 102, the second laser set 104, and the light-mixing unit 106 are depicted in FIG. 2 and the other optical components (e.g., the condensing lens 16, the light-homogenizing member 18 and the diffusing sheet 28) of the multicolor light mixing module 100 are omitted herein.

As shown in FIG. 3 and FIG. 4, the first laser set 102 includes the plurality of first lighting units 22 (six shown in FIG. 4, but not limited thereto) and the plurality of second lighting units 24 (four shown in FIG. 4, but not limited thereto). The second laser set 104 includes the plurality of third lighting units 26 (six shown in FIG. 4, but not limited thereto). The first lighting units 22, the second lighting units 24 and the third lighting units 26 are arranged symmetrically relative to the first symmetrical axis S1 (i.e., a diagonal axis as shown in FIG. 4) to form a lighting matrix M. The transmissive and reflective member 110 is obliquely disposed on the first light-mixing axis C1 and located between the condensing lens 16 and the reflecting sheet 108, and a projection of the transmissive and reflective sheet 110 partially covers the lighting matrix M. The reflecting sheet 108 is obliquely disposed on the first light-mixing axis C1, and a projection of the reflecting sheet 108 completely covers the lighting matrix M. Oblique angles of the reflecting sheet 108 and the transmissive and reflective sheet 110 relative to the first light-mixing axis C1 could be preferably equal to 45°, but not limited thereto.

Via the aforesaid designs, as shown in FIG. 3, the transmissive and reflective sheet 110 can allow the first color light L1, the second color light L2 and the third color light L3 to partially pass through the reflecting sheet 108 at a first ratio (preferably 50%, but not limited thereto) and reflects the first color light L1, the second color light L2 and the third color light L3 partially to the condensing lens 16 at a second ratio (preferably 50%, but not limited thereto). At the same time, the reflecting sheet 108 can reflect the first color light L1, the second color light L2 and the third color light L3 to the transmissive and reflective sheet 110 and the condensing lens 16. Accordingly, the first color light L1, the second color light L2 and the third color light L3 can form the first laser beam B1 along the first light-mixing axis C1 and form a second laser beam B2 along a second light-mixing axis C2 cooperatively. As such, the multicolor light mixing module of the present invention can adopt the design in which the first lighting units 22, the second lighting units 24 and the third lighting units 26 are disposed symmetrically in a matrix arrangement relative to the diagonal axis and the light-mixing unit 106 is utilized to mix the first color light L1, the second color light L2, and the third color light L3, so as to achieve the light mixing effect that the present invention can provide the laser beam with multicolor lights distributed in proper proportions. In such a manner, the present invention can efficiently solve the uneven color distribution problem on the image projected by the laser projection apparatus aforementioned in the prior art.

To be noted, the design in which the first lighting units 22, the second lighting units 24 and the third lighting units 26 are disposed symmetrically in a matrix arrangement is not limited to the aforesaid embodiment. That is, the present invention could adopt other symmetrical matrix design in which the first symmetrical axis S1 could be a diagonal axis, a horizontal axis, a vertical axis, or a center normal axis of the lighting matrix M. For example, please refer to FIG. 5, which is a diagram of the first lighting units 22, the second lighting units 24 and the third lighting units 26 arranged in different symmetrical matrixes according to other embodiments of the present invention.

Figure 5:
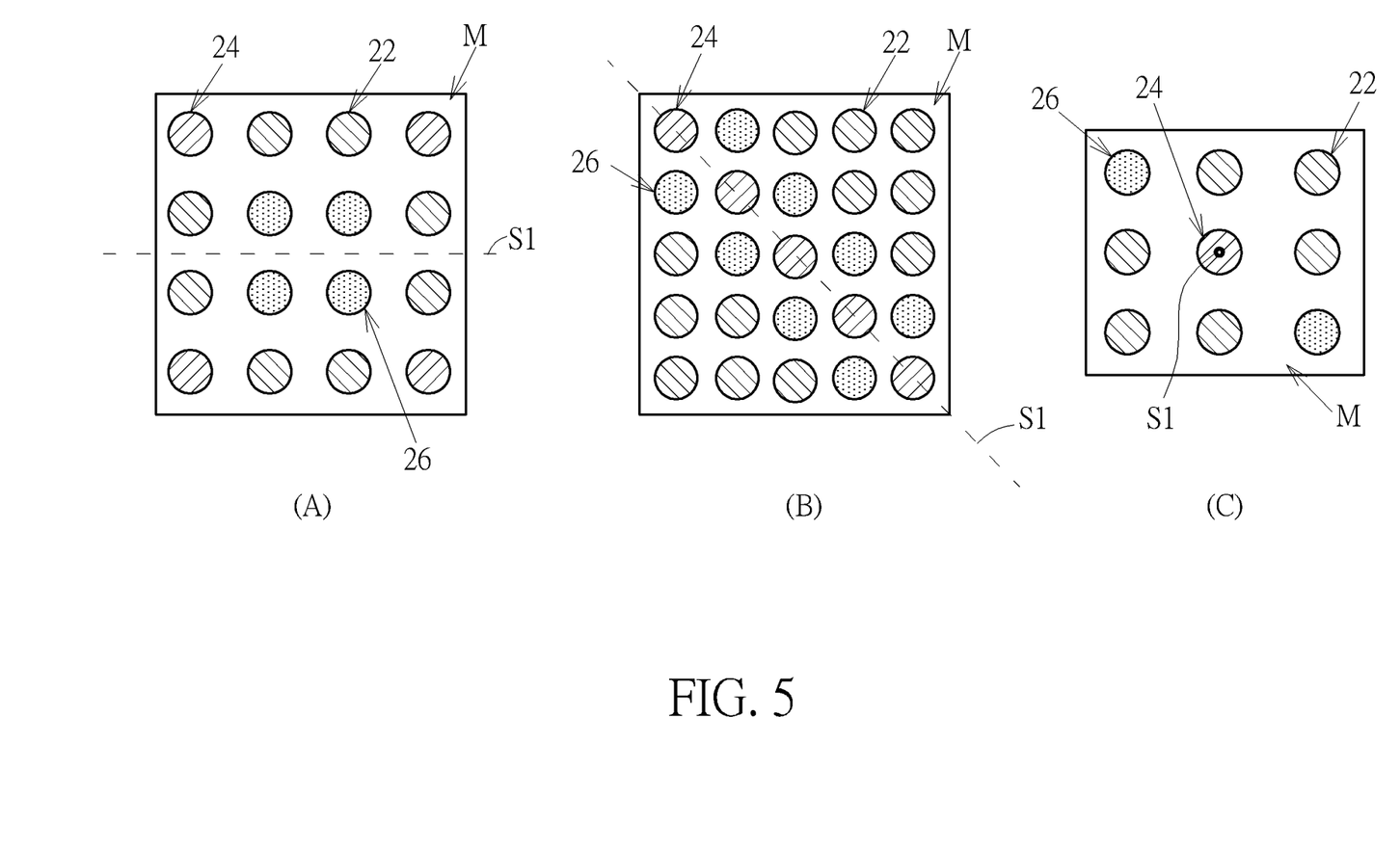
FIG. 5 is a diagram of the first lighting units, the second lighting units and the third lighting units arranged in different symmetrical matrixes according to other embodiments of the present invention.

As shown in FIG. 5(A), four third lighting units 26 could form a 4×4 lighting matrix M cooperatively with eight first lighting units 22 and four second lighting units 24 relative to the first symmetrical axis S1 (i.e., the horizontal axis as shown in FIG. 5(A)). As shown in FIG. 5(B), eight third lighting units 26 could form a 5×5 lighting matrix M cooperatively with twelve first lighting units 22 and five second lighting units 24 relative to the first symmetrical axis S1 (i.e., the diagonal axis as shown in FIG. 5(B)). As shown in FIG. 5(C), two third lighting units 26 could form a 3×3 lighting matrix M cooperatively with six first lighting units 22 and one second lighting unit 24 relative to the first symmetrical axis S1 (i.e., the center normal axis as shown in FIG. 5(C)). As for the related description for other derived embodiments, it could be reasoned by analogy according to FIG. 5 and omitted herein.

In addition, the light source configuration of the multicolor light mixing module of the present invention is not limited to the aforesaid embodiments. For example, please refer to FIG. 6, which is a diagram of a multicolor light mixing module 200 according to another embodiment of the present invention. Components both mentioned in this embodiment and the aforesaid embodiment represent components with similar structures or functions, and the related description could be reasoned by analogy according to the aforesaid embodiment and omitted herein. In this embodiment, the multicolor light mixing module 200 could include the first laser set 12, the second laser set 14, the condensing lens 16, the light-homogenizing member 18, the diffusing sheet 28, a third laser set 202, a fourth laser set 204 and a light-mixing unit 206. For more clearly showing the light path of the multicolor light mixing module 200, only the first laser set 12, the second laser set 14, the third laser set 202, the fourth laser set 204 and the light-mixing unit 206 are depicted in FIG. 6 and the other optical components (e.g., the condensing lens 16, the light-homogenizing member 18 and the diffusing sheet 28) of the multicolor light mixing module 200 are omitted herein.

Figure 6:
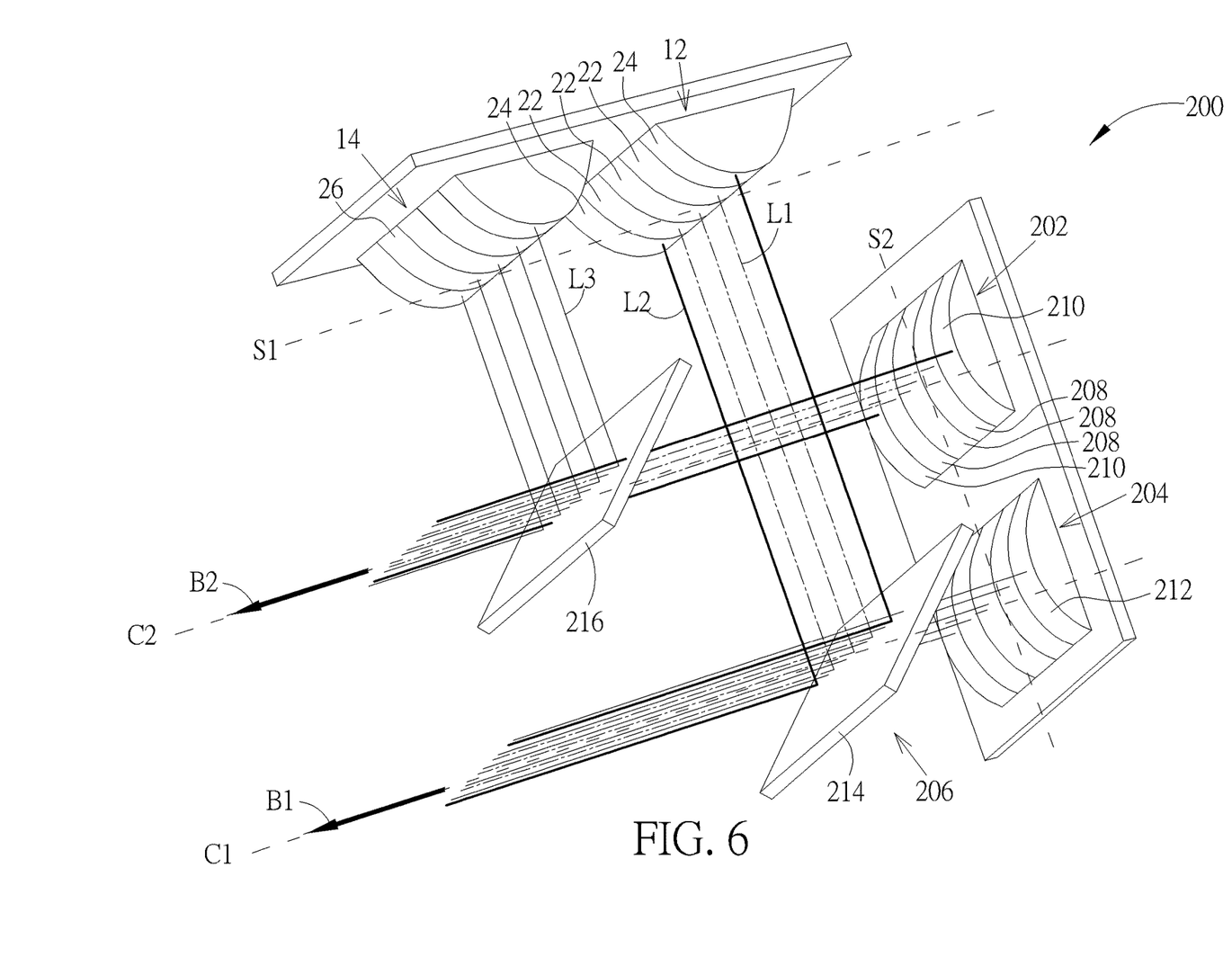
FIG. 6 is a diagram of a multicolor light mixing module according to another embodiment of the present invention.

As shown in FIG. 6, the third laser set 202 includes the plurality of fourth lighting units 208 (three shown in FIG. 6, but not limited thereto) and at least one fifth lighting unit 210 (two shown in FIG. 6, but not limited thereto). The fourth laser set 204 includes the plurality of sixth lighting units 212 (five shown in FIG. 6, but not limited thereto). The fourth lighting unit 208 could be preferably a green laser diode for emitting the first color light L1 (i.e., green light). The fifth lighting unit 210 could be preferably a blue laser diode for emitting the second color light L2 (i.e., blue light). The sixth lighting unit 212 could be preferably a red laser diode for emitting the third color light L3 (i.e., red light). The present invention is not limited to the aforesaid design, meaning that the color configuration and the type of light source could be varied with the practical application of the multicolor light mixing module 200. Furthermore, in this embodiment, the fourth lighting units 208 and the fifth lighting units 210 could be arranged symmetrically relative to a second symmetrical axis S2 (in blue-green-green-green-blue order as shown in FIG. 6, but not limited thereto), and the sixth lighting units 26 could be arranged symmetrically relative to the second symmetrical axis S2 (in red-red-red-red-red order as shown in FIG. 6, but not limited thereto). The first symmetrical axis S1 could be preferably parallel to the first light-mixing axis C1 and the second light-mixing axis C2 and the second symmetrical axis S2 could be preferably perpendicular to the first light-mixing axis C1 and the second light-mixing axis C2 (but not limited thereto).

The mixing design of the light-mixing unit 206 could be as shown in FIG. 6. The light-mixing unit 206 could include a first dichroic sheet 214 and a second dichroic sheet 216. The first dichroic sheet 214 is obliquely disposed on the first light-mixing axis C1 and opposite to the first laser set 12 (preferably, an oblique angle of the first dichroic sheet 214 relative to the first light-mixing axis C1 is equal to 45°, but not limited thereto) and is located between the condensing lens 16 and the fourth laser set 204. The second dichroic sheet 216 is obliquely disposed on the second light-mixing axis C2 and opposite to the second laser set 14 (preferably, an oblique angle of the second dichroic sheet 216 relative to the second light-mixing axis C2 is equal to 45°, but not limited thereto) and is located between the condensing lens 16 and the third laser set 202.

Via the aforesaid design, the first dichroic sheet 214 can reflect the first color light L1 and the second color light L2 and allow the third color light L3 to pass therethrough, and the second dichroic sheet 216 can reflect the third color light L3 and allow the first color light L1 and the second color light L2 to pass therethrough, so as to make the first color light L1, the second color light L2 and the third color light L3 to form the first laser beam B along the first light mixing axis C1 and form the second laser beam B2 along the second light mixing axis C2, so as to achieve the light mixing effect that the present invention can provide the laser beam with multicolor lights distributed in proper proportions. In such a manner, the present invention can efficiently solve the uneven color distribution problem on the image projected by the laser projection apparatus aforementioned in the prior art.

Furthermore, in the practical application, the second laser set, the third laser set, the fourth laser set mentioned in the aforesaid embodiments are omissible components. In brief, in another embodiment that the second laser set, the third laser set and the fourth laser set are omitted, the multicolor light mixing module of the present invention can adopt the design in which the first lighting units and the second lighting units are disposed symmetrically and the light-mixing unit is utilized to mix the first color light and the second color light, so as to achieve the light mixing effect that the present invention can provide the laser beam with multicolor lights (e.g., blue and green lights) distributed in proper proportions. In such a manner, the present invention can efficiently solve the uneven color distribution problem on the image projected by the laser projection apparatus aforementioned in the prior art. As for other related description for this embodiment, it could be reasoned by analogy according to the aforesaid embodiments and omitted herein.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A multicolor light mixing module suitable for providing a multicolor laser beam to a laser projection apparatus, the multicolor light mixing module comprising:
a first laser set comprising a plurality of first lighting units and at least one second lighting unit, at least one of the plurality of first lighting units and the at least one second lighting unit being arranged symmetrically relative to a first symmetrical axis, the plurality of first lighting units emitting a first color light, the at least one second lighting unit emitting a second color light;
a light-mixing unit obliquely disposed on a first light-mixing axis and opposite to the plurality of first lighting units and the at least one second lighting unit, for reflecting the first color light and the second color light to cooperatively form a first laser beam along the first light-mixing axis;
a light-homogenizing member disposed on the first light-mixing axis for homogenizing the first laser beam; and
a condensing lens disposed on the first light-mixing axis and located between the light-homogenizing member and the light-mixing unit for condensing the first laser beam.

2. The multicolor light mixing module of claim 1, wherein the multicolor light mixing module further comprises a second laser set, the light-mixing unit comprises a reflecting sheet and a dichroic sheet, the second laser set comprises a plurality of third lighting units, the plurality of third lighting units is arranged symmetrically relative to the first symmetrical axis and emits a third color light, the reflecting sheet is obliquely disposed on the first light-mixing axis and opposite to the plurality of first lighting units and the at least one second lighting unit for reflecting the first color light and the second color light, the dichroic sheet is obliquely disposed on the first light-mixing axis and opposite to the plurality of third lighting unit, the dichroic sheet is located between the condensing lens and the reflecting sheet for reflecting the third color light to travel along the first light-mixing axis and allowing the first color light and the second color light to pass therethrough, so as to make the third color light form the first laser beam cooperatively with the first color light and the second color light.

3. The multicolor light mixing module of claim 2, wherein oblique angles of the reflecting sheet and the dichroic sheet relative to the first light-mixing axis are equal to 45°.

4. The multicolor light mixing module of claim 2, wherein the first symmetrical axis is parallel to the first light-mixing axis.

5. The multicolor light mixing module of claim 2, wherein the first color light is a green light, the second color light is a blue light, and the third color light is a red light.

6. The multicolor light mixing module of claim 1, wherein the multicolor light mixing module further comprises a second laser set, the light-mixing unit comprises a reflecting sheet and a transmissive and reflective sheet, the second laser set comprises a plurality of third lighting units, the plurality of third lighting units emits a third color light and is arranged symmetrically relative to the first symmetrical axis with the plurality of first lighting units and the at least one second lighting unit to form a lighting matrix, the transmissive and reflective sheet is obliquely disposed on the first light-mixing axis and located between the condensing lens and the reflecting sheet, a projection of the transmissive and reflective sheet partially covers the lighting matrix, the reflecting sheet is obliquely disposed on the first light-mixing axis, and a projection of the reflecting sheet covers the lighting matrix;
wherein the transmissive and reflective sheet allows the first color light, the second color light, and the third color light to partially pass through the reflecting sheet at a first ratio and reflects the first color light, the second color light, and the third color light partially to the condensing lens at a second ratio, and the reflecting sheet reflects the first color light, the second color light, and the third color light, so as to make the first color light, the second color light, and the third color light to form the first laser beam along the first light-mixing axis and form a second laser beam along a second light-mixing axis;
wherein the condensing lens condenses the first laser beam and the second laser beam, and the light-homogenizing member homogenizes the first laser beam and the second laser beam.

7. The multicolor light mixing module of claim 6, wherein oblique angles of the reflecting sheet and the transmissive and reflective sheet relative to the first light-mixing axis is equal to 45°.

8. The multicolor light mixing module of claim 6, wherein the first symmetrical axis is a diagonal axis, a horizontal axis, a vertical axis or a center normal axis of the lighting matrix.

9. The multicolor light mixing module of claim 6, wherein the first ratio is 50%, and the second ratio is 50%.

10. The multicolor light mixing module of claim 6, wherein the first color light is a green light, the second color light is a blue light, and the third color light is a red light.

11. The multicolor light mixing module of claim 1, wherein the multicolor light mixing module further comprises a second laser set, a third laser set, and a fourth laser set, the light-mixing unit comprises a first dichroic sheet and a second dichroic sheet, the second laser set comprises a plurality of third lighting units, the plurality of third lighting units is arranged symmetrically relative to the first symmetrical axis and emits a third color light, the third laser set comprises a plurality of fourth lighting units and at least one fifth lighting unit, at least one of the plurality of fourth lighting units and the at least one fifth lighting unit is arranged symmetrically relative to a second symmetrical axis, the plurality of fourth lighting units emits the first color light, the at least one fifth color unit emits the second color light, the fourth laser set comprises a plurality of sixth lighting units, the plurality of sixth lighting units is arranged symmetrically relative to the second symmetrical axis and emits the third color light, the first dichroic sheet is obliquely disposed on the first light-mixing axis and opposite to the first laser set and is located between the condensing lens and the fourth laser set, the second dichroic sheet is obliquely disposed on a second light-mixing axis and opposite to the second laser set and is located between the condensing lens and the third laser set;
wherein the first dichroic sheet reflects the first color light and the second color light and allows the third color light to pass therethrough, and the second dichroic sheet reflects the third color light and allows the first color light and the second color light to pass therethrough, so as to make the first color light, the second color light, and the third color light to form the first laser beam along the first light-mixing axis and form a second laser beam along the second light-mixing axis;

wherein the condensing lens condenses the first laser beam and the second laser beam, and the light-homogenizing member homogenizes the first laser beam and the second laser beam.

12. The multicolor light mixing module of claim 11, wherein the first symmetrical axis is parallel to the first light-mixing axis and the second light-mixing axis, and the second symmetrical axis is perpendicular to the first light-mixing axis and the second light-mixing axis.

13. The multicolor light mixing module of claim 11, wherein an oblique angle of the first dichroic sheet relative to the first light-mixing axis is equal to 45°, and an oblique angle of the second dichroic sheet relative to the second light-mixing axis is equal to 45°.

14. The multicolor light mixing module of claim 11, wherein the first color light is a green light, the second color light is a blue light, and the third color light is a red light.

15. The multicolor light mixing module of claim 1, wherein the light-homogenizing member is a hollow homogenizing pipe or a solid homogenizing column.

16. The multicolor light mixing module of claim 1 further comprising:
 a diffusing sheet disposed between the light-homogenizing member and the condensing lens for diffusing the first laser beam.

* * * * *